No. 876,456. PATENTED JAN. 14, 1908.
J. M. HINES.
BRAKE APPLYING MECHANISM.
APPLICATION FILED OCT. 23, 1907.
2 SHEETS—SHEET 1.
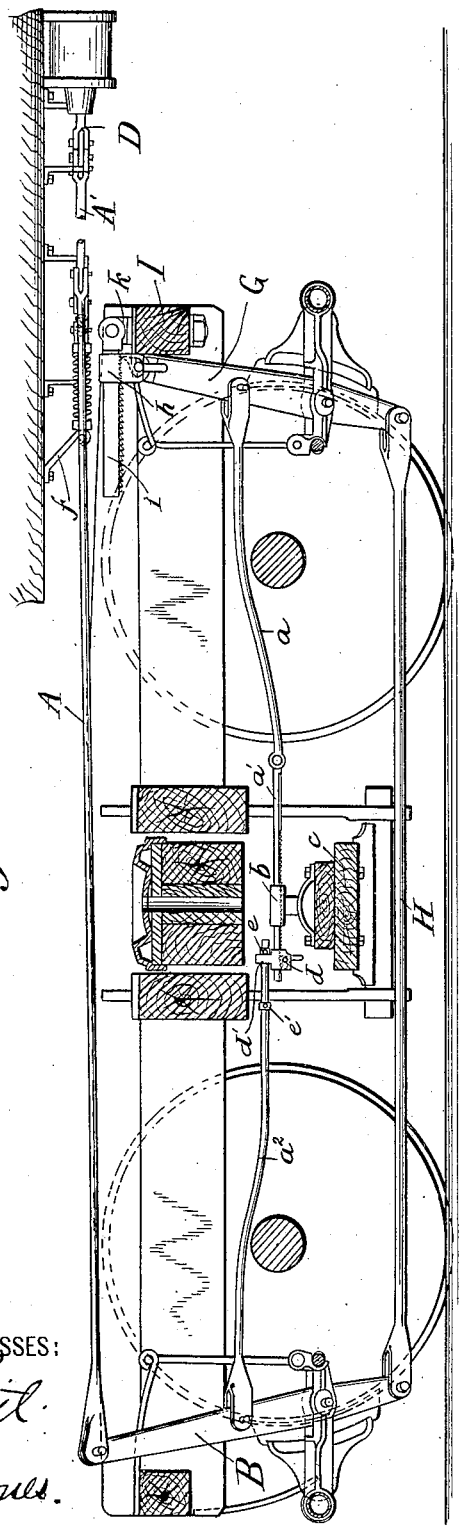
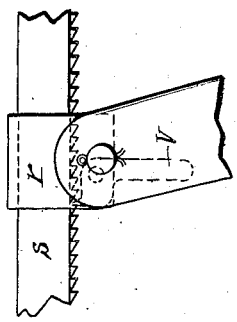
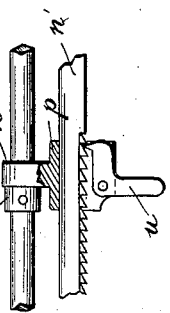
WITNESSES:
INVENTOR
BY
ATTORNEYS

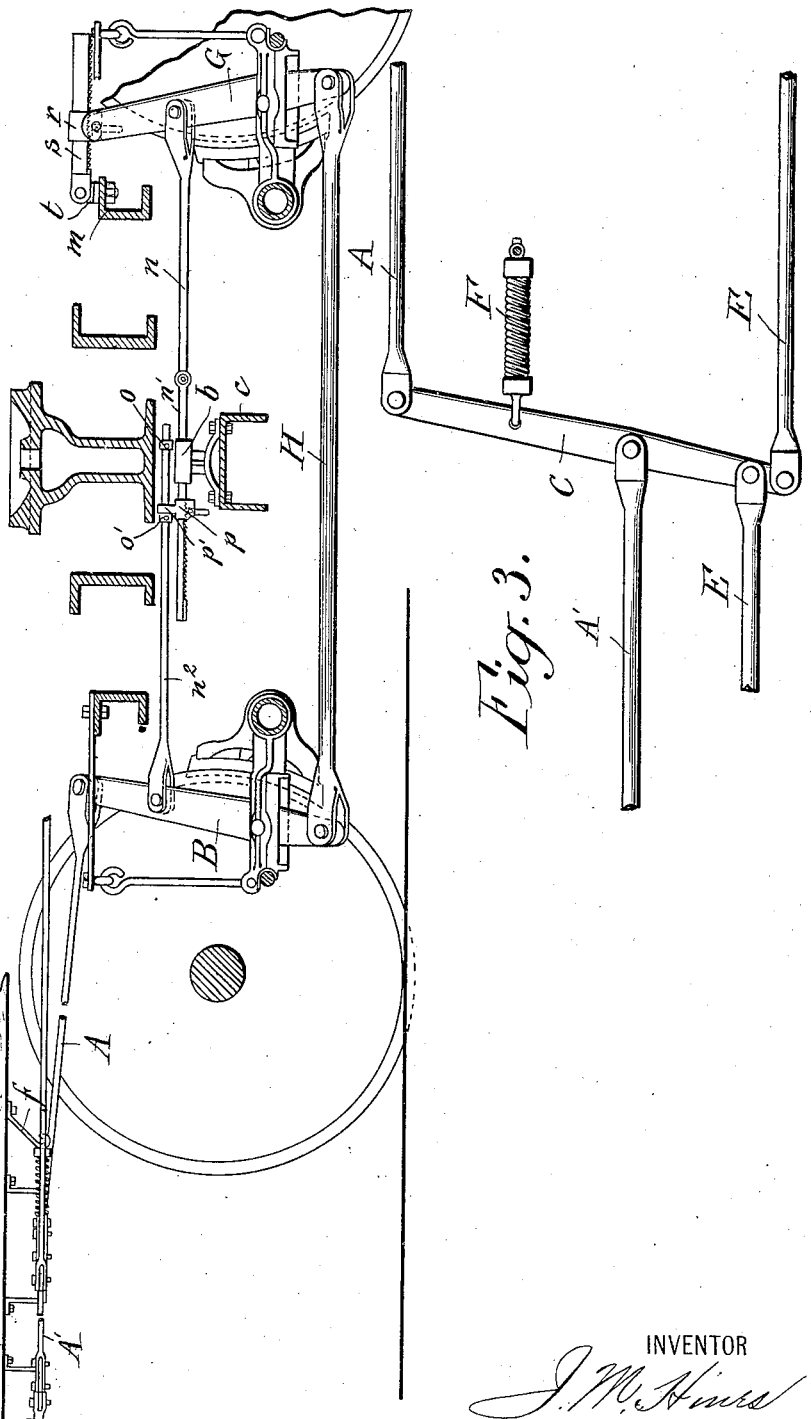

UNITED STATES PATENT OFFICE.

JAMES M. HINES, OF ALBANY, NEW YORK.

BRAKE-APPLYING MECHANISM.

No. 876,456.   Specification of Letters Patent.   Patented Jan. 14, 1908.

Application filed October 23, 1907. Serial No. 398,824.

*To all whom it may concern:*

Be it known that I, JAMES M. HINES, a citizen of the United States, residing at Albany, in the county of Albany and State of New York, have invented certain new and useful Improvements in Brake-Applying Mechanism; and I do hereby declare the following to be a full, clear, and exact description of the invention, such as will enable others skilled in the art to which it appertains to make and use the same.

My invention particularly relates to brake-applying mechanism for four-wheel trucks provided with attachments for automatically taking up the slack in the system due to the wear of the brake-shoes, the stretching of the brake-rods, etc.

The particular nature and objects of the invention will be understood from the following description and the accompanying drawings.

In the drawings, Figure 1 is a sectional view of a four-wheel truck provided with my improved mechanism as applied to outside-hung brake-beams; Fig. 2 is a similar view showing my improved mechanism as applied to inside-hung brake-beams; Fig. 3 is a detail plan view of the equalizing or floating lever and retracting spring and connections; Figs. 4 and 5 are detail views of the pawl boxes and their associated parts.

Referring to Fig. 1, the main brake rod A extends from the upper end of the live lever B to the floating or equalizing lever C (see Fig. 3). From this lever the rod A' extends to the brake cylinder lever D. From the end of the floating lever C opposite the end to which the rod A is attached the hand brake rods E extend. A coiled retracting spring F extends from the floating lever C between the rods A and A' to a fixed hook $f$ depending from the vehicle body and this spring serves to retract the live lever to its full release position. The live lever B and the dead lever G are connected at their lower ends by the rigid lower-brake-rod H and the live and dead levers are pivoted in the struts of their respective brake-beams. Extending between the live lever and the dead lever above their pivots is a two-part adjusting rod. One part of this rod $a$ extending from the dead lever has a pivoted extension $a'$ provided with teeth on its lower surface and supported at the center of the truck by a tubular guide casing $b$ supported on the spring-plank $c$. The part $a'$ passes freely through this guide-casing. On the extremity of this part $a'$ beyond the guide-casing is mounted a pawl-box $d$ having an upstanding lug $d'$ through which the other piece $a^2$ of the two-part adjusting rod passes. This piece $a^2$ carries the adjustable collars $e$ and $e'$, one on each side of the lug $d'$. To the upper end of the dead lever is connected a pawl-box $h$ which slides on a toothed rack $i$, the forked end of which is pivoted on a lug $k$ which is in turn swiveled on the end-piece $l$ of the truck frame. The rack $i$ is thus secured to the end-piece of the truck frame by a universal joint. By this means I am able to prevent the binding of the pawl-box on the rack.

The operation of these parts is as follows: Upon the application of the brakes the pull of the main brake-rod A moves the brakes toward the wheels through the live and dead levers and the lower brake rod H. This movement causes the parts $a$ and $a^2$ of the two-part adjusting rod to move toward one another and the end of the part $a^2$ slides through the lug $d'$ on the pawl-box $d$ freely until the collar $e'$ engages the lug $d'$. The collars are so set that this range of movement is equivalent to the movement necessary to apply the brakes when they are in proper condition. If there is any slack in the system a further movement will be necessary to fully apply the brakes, and this movement causes the pawl-box $d$ to slide along the rack on the part $a'$. The pawl-box is arranged to slide freely in this direction but to lock on the return direction. When the brakes are released the retracting spring F draws the live lever back to its full release position and the brake shoes fall back freely until the collar $e$ engages the lug $d'$ of the pawl-box in its new position. The further movement of the live lever towards its full release position turns the dead lever on its pivot in its brake-beam strut and causes the pawl-box $h$ to slide along the rack $i$ to establish a new fulcrum for the dead lever, thus simultaneously taking up the slack in the system and preventing the further falling away of the brake-shoes and leaving the parts in proper position for the next application of the brakes.

The arrangement of mechanism in Fig. 2 is substantially like that in Fig. 1, except that it is applied to inside-hung brake-beams, instead of to outside-hung brake-beams. In this case, the two-part adjusting rod extending from the live lever to the dead lever is made up of a part $n$ extending from the dead lever and having a pivoted piece $n'$ which extends through the tubular guide casing $b$ mounted on the spring plank. This part $n'$ carries beyond the tubular casing $b$ a pawl-box $p$ having an upstanding lug $p'$. The part $n^2$ extending from the live lever passes through this upstanding lug and has the adjustable collars $o$ and $o'$, one on each side of the lug. To the upper end of the dead lever is connected a pawl-box $r$ which slides on the toothed rack $s$ which is pivoted on an upstanding lug $t$ swiveled to the extra-transom $m$. Upon the application of the brakes the excess movement of the brake shoes due to slack in the system is transmitted through the collar $o$ to the pawl-box $p$, sliding it along the piece $n'$. On the release movement of the brakes the return of the live lever to its full release position causes the adjusting rod which has now been lengthened to move the dead lever on its pivot, sliding the pawl-box $r$ along the rack $s$.

Fig. 4 is a detail view of the pawl-box $p$ which is in all respects similar to the pawl-box $d$ excepting that the parts are reversed. From this figure it will be seen that a pivoted dog $u$ engages the rack in one direction and slides along the rack in the other direction. Fig. 5 is a similar view of the pawl-box $r$ which is in all respects like the pawl-box $h$ except that the parts are reversed. It will be seen that a pivoted dog $v$ similar to the dog $u$ engages the rack in one direction and slides along the rack in the other direction.

What I claim is:

1. In a brake-applying mechanism for four-wheel trucks, a live lever and a dead lever pivotally connected to the respective brake beams, a lower brake-rod connecting said levers, an adjusting rod including take-up mechanism and a lost motion device extending between said levers, whereby an excess movement of the brake-beams toward the wheels changes the reach of the adjusting-rod, and mechanism actuated by the adjusting rod on the release movement of the brakes to change the fulcrum of the dead lever and take up the slack in the system, substantially as described.

2. In a brake-applying mechanism for four-wheel trucks, a live lever and a dead lever pivotally connected to the respective brake-beams, a lower brake-rod connecting said levers, an adjusting rod including take-up mechanism and a lost-motion device extending between said levers, whereby an excess movement of the brake beams toward the wheels changes the reach of the adjusting rod, a tubular guide casing for the adjusting rod supported from the truck, and mechanism actuated by the adjusting rod on the release movement of the brakes to change the fulcrum of the dead lever and take up the slack in the system, substantially as described.

3. In a brake-applying mechanism for four-wheel trucks, a live lever and a dead lever pivotally connected to the respective brake-beams, a lower brake-rod connecting said levers, a two-part adjusting rod extending between said levers, take-up mechanism connecting the two parts of said rod through a lost-motion device, whereby an excess movement of the brake-beams toward the wheels actuates the take-up device to change the reach of the adjusting rod, and mechanism atuated by the adjusting rod on the release movement of the brakes to change the fulcrum of the dead lever and take up the slack in the system, substantially as described.

4. In a brake-applying mechanism for four-wheel trucks, a live lever and a dead lever pivotally connected to the respective brake-beams, a lower-brake-rod connecting said levers, a two-part adjusting-rod extending between said levers and comprising a part extending from one lever and having a pivoted extension, a tubular guide casing supported from the truck and through which the pivoted extension passes, a rack on the extension, a pawl box sliding on the rack, a part extending from the other brake rod into engagement with the pawl-box, and spaced collars on said part permitting a lost motion between the said part and the pawl-box, whereby an excess movement of the brake-beams toward the wheels moves the pawl-box on the rack to change the reach of the adjusting rod, and mechanism actuated by the adjusting rod on the release movement of the brakes to change the fulcrum of the dead lever and take up the slack in the system, substantially as described.

5. In a brake-applying mechanism for four-wheel trucks, a live lever and a dead lever pivotally connected to the respective brake-beams, a lower-brake-rod connecting said levers, a two-part adjusting-rod extending between said levers and comprising a part extending from one lever and having a pivoted extension, a tubular guide casing supported from the truck and through which the pivoted extension passes, a rack on the extension, a pawl-box sliding on the rack, a part extending from the other brake-rod into engagement with the pawl-box, and spaced collars on said part permitting a lost motion between the said part and the pawl-box, whereby an excess movement of the brake beams toward the wheel moves the pawl-box on the rack to change the reach of the adjusting rod, a pawl-box attached to the upper end of the dead lever, a rack upon which the pawl-box slides, a support for said rack, and a universal joint between the rack and its support, substantially as described.

6. In brake-applying mechanism for vehicles, a floating lever, an actuating rod connected thereto, a main-brake-rod extending from the floating lever to a live lever on the truck, and a retracting spring extending from a fixed point on the vehicle to the floating lever between the actuating rod and the main-brake-rod, to return the parts to the full release position, substantially as described.

7. In a slack take-up device for brake-applying mechanism, a rack, a pawl-box sliding on said rack, a support for the rack, and a universal joint between the rack and its support, substantially as described.

8. In a slack take-up device for brake-applying mechanism, a rack, a pawl-box sliding on the rack, a support for the rack, and a swivel connection between the rack and its support, substantially as described.

In testimony whereof I affix my signature in presence of two witnesses.

JAMES M. HINES.

Witnesses:
H. S. KENDALL,
THOMAS E. WALSH.